United States Patent
Doerfling

[11] 3,784,212
[45] Jan. 8, 1974

[54] COMPOSITE GASKET

[75] Inventor: Ralph G. Doerfling, Walled Lake, Mich.

[73] Assignee: Detroit Gasket Manufacturing Company, Oak Park, Mich.

[22] Filed: May 22, 1972

[21] Appl. No.: 255,812

[52] U.S. Cl. .............................. 277/22, 277/235 B
[51] Int. Cl. ................................... F16j 15/12
[58] Field of Search ......................... 277/22, 235 B

[56] References Cited
UNITED STATES PATENTS
1,814,283   7/1931   Braner .................................. 277/22
2,055,471   9/1936   Balfe ................................. 277/235 B Primary Examiner—Herbert F. Ross
Assistant Examiner—Robert I. Smith
Attorney—Harness, Dickey & Pierce

[57] ABSTRACT

A composite gasket suitable for use as a cylinder head gasket for internal combustion engines or the like. The gasket comprises a deformable base sheet having a plurality of openings therein, the edges of which are reinforced by overlying metal grommets. Heat-conductive strips overlie the face surfaces of the base sheet and are disposed in heat conductive contact with the reinforcing grommets and are effective to rapidly conduct heat away from localized hot-spots to areas of cooler temperature, thereby substantially prolonging the useful operating life of the gasket.

7 Claims, 4 Drawing Figures

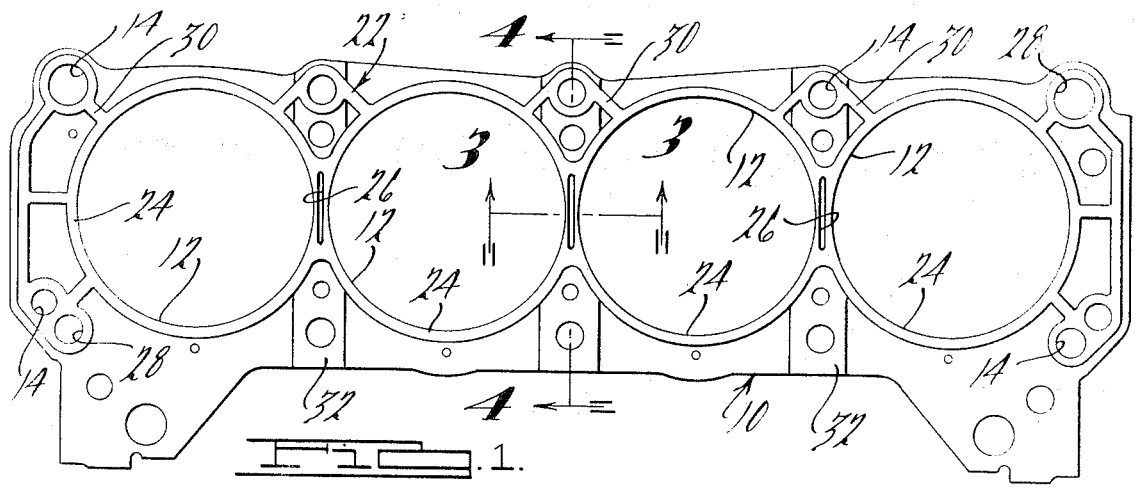
FIG. 1.
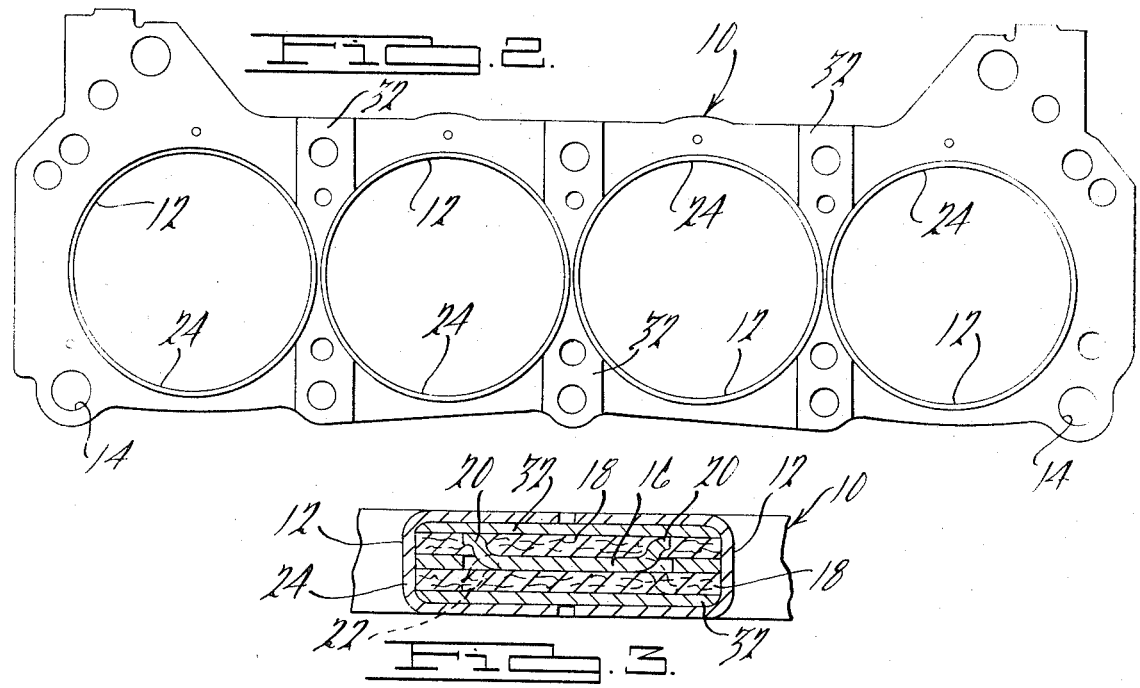
FIG. 2.
FIG. 3.
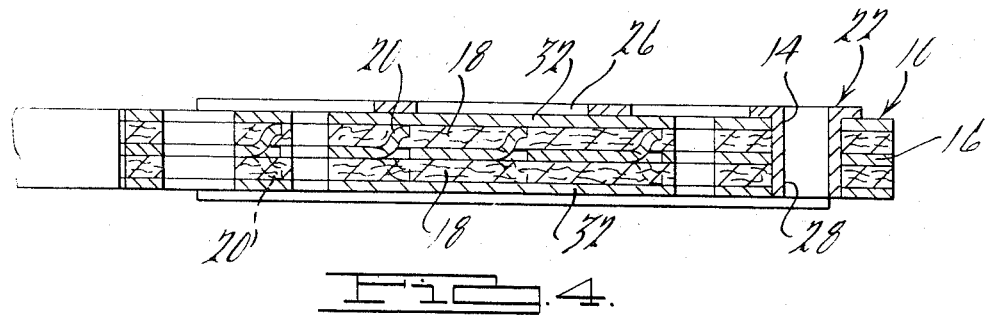
FIG. 4.

COMPOSITE GASKET

BACKGROUND OF THE INVENTION

A variety of gasketing compositions and constructions have heretofore been used or proposed for sealing flanged connections of various mechanical devices. In situations wherein the gaskets are subjected to elevated temperatures during operation, various heat-resistant materials are employed, including compressible or deformable materials such as asbestos, either alone or in combination with various metallic filler materials and metal reinforcing members to maintain proper sealing in spite of any warpage of the flanges that may occur at such temperatures. In general, the inclusion of various constituents to the gasket material and/or the provision of additional structural features to assure satisfactory operation at elevated temperatures has heretofore occasioned a disproportionate increase in the cost of such gasketing materials.

The present invention overcomes the problems and economic disadvantages associated with gasketing materials of the types heretofore known by providing a simple and inexpensive expedient in preventing the formation of so-called "hot-spots" over localized areas of a gasket material, thereby substantially increasing the flexibility and versatility in its use, as well as substantially prolonging the useful operating life thereof.

SUMMARY OF THE INVENTION

The benefits and advantages of the present invention are achieved by a composite gasket material which comprises a deformable base sheet which may be of a laminated structure and is formed with a plurality of openings therethrough corresponding in size and location to the ports of the flanged connection between which the gasket is adapted to be installed. The face surfaces of the base sheet are usually of a heat-resistant low-conductivity material, such as asbestos, for example, and the edges of the openings in the base sheet, as well as the area immediately adjacent thereto, are reinforced by a metallic reinforcing grommet disposed in overlying clamping engagement with the base sheet. One or a plurality of heat-conductive strips, preferably comprised of graphite, are disposed in overlying relationship on at least one face of the base sheet and extend from a position located between adjoining apertures to cooler areas disposed remotely therefrom. The quantity and disposition of the heat-conductive strips can be varied so as to provide for optimum heat dissipation for any given gasket installation, assuring satisfactory gasket performance over prolonged operating periods.

Additional advantages and benefits of the present invention will become apparent upon a reading of the description of the preferred embodiments taken in conjunction with the accompanying drawing.

BRIEF DESCRIPTION OF THE DRAWING

FIG. 1 is a plan view of a typical composite gasket material constructed in accordance with the preferred embodiments of this invention;

FIG. 2 is a plan view of the opposite face of the gasket shown in FIG. 1;

FIG. 3 is a transverse vertical sectional view through the composite gasket material at a location between adjoining apertures therein as shown in FIG. 1, and taken along the line 3—3 thereof; and FIG. 4 is a transverse vertical sectional view through the composite gasket material shown in FIG. 1, and taken substantially along the line 4—4 thereof.

DESCRIPTION OF THE PREFERRED EMBODIMENTS

Referring now in detail to the drawing, a cylinder head gasket 10 is illustrated which is suitable for use on a four-cylinder in-line internal combustion engine. Tha gasket is of a generally elongated rectangular planar configuration and is provided with four openings or apertures 12 which are disposed in aligned relationship and correspond to the size and location of the four cylinders in the engine block over which the gasket is adapted to be mounted. Additionally, various smaller apertures 14 are provided around the peripheral portions of the gasket for accommodating the studs and screws for fastening the head to the engine block, as well as for providing passageways for coolants and lubricants passing between the engine block and the head assembly.

The gasket 10 is of a composite construction and in the specific embodiment illustrated, is comprised of a laminated base sheet consisting of a centrally extending metal sheet 16 having a fibrous-type face sheet 18 overlying and suitably affixed to each side thereof such as by means of a plurality of tangs 20 embedded therein. The tangs 20 are preferably integrally formed with the metal sheet 16 and project outwardly from each side face thereof to a position contiguous to the outer face surface of each of the facing sheets 18, forming a secure mechanical interlock therebetween.

The central metal sheet 16 may comprise any suitable metal or metal alloy which is of satisfactory strength, including copper and alloys of copper as well as low alloy steels, and which can readily be fabricated into a configuration as shown. The fibrous face sheets 18 may suitably comprise any reasonably heat-resistant material including rubber, cork, cellulosic fibrous sheets or paper stock, as well as inorganic fibers, of which asbestos comprises the preferred material. The face sheets 18 may further include various bonding agents and filler and additive constituents to enhance the physical strength properties of the facing sheets, as well as for increasing their resistance against deterioration upon coming in contact with the liquid coolant and combustion gases at elevated operating temperatures. Various impregnating agents may also be advantageously employed for reducing the permeability of the face sheet, further improving its sealing characteristics under high pressures.

In order to further enhance the physical strength properties of the gasket, a thin metallic reinforcing matrix or network 22 is applied over one face of the gasket, as best seen in FIG. 1, and extends over all areas and edges which are subjected during use to excessive heat, pressure, wear, abrasion and/or chemical attack. The reinforcing network 22, as shown in FIGS. 1 and 2, principally comprises four reinforcing grommets 24, which are of a generally U-shaped cross sectional configuration and are disposed in overlying and clamping relationship with the edges and immediate adjoining faces of the base sheet. The reinforcing grommets 24 are integrally connected to the reinforcing network and are separated from one another by elongated apertures 26, as shown in FIG. 1, serving to reduce the transfer of heat from one reinforcing grommet to the next adjoining one. Additionally, the reinforcing network comprises a plurality of smaller grommets 28, which are interconnected by narrow webs 30, serving to further reinforce peripheral sections of the gasket in those areas as may be required or desired.

It will be apparent from the construction of the gasket as illustrated in FIGS. 1 and 2 that during operation of an internal combustion engine, the sections of the gasket disposed between the adjoining cylinders as defined by the circular openings 12 attain substantially higher operating temperatures in view of the absence of coolant passageways between the siamesed cylinder bores. This situation is further aggravated in those sections at which the exhaust valves are located, contributing toward still further fluctuations in the temperatures to which the gasket material is exposed during operation. To avoid a localized heat buildup or hot-spot, at such areas, strips 32 of a heat-conductive material are applied to the opposed faces of the facing sheets 18 and extend transversely with respect to the longitudinal axis of the gasket and to the side edges thereof corresponding to areas which normally are at substantially lower temperatures during the operation of the engine. The heat-conductive strips 32 are disposed in clamped and heat-conductive contact with the reinforcing grommets 24 and other sections of the reinforcing network 22, thereby serving as a path for facilitating a continual extraction of heat from the critical areas to cooler areas remote therefrom.

The heat-conductive strips 32 may comprise any suitable material which is deformable so as to facilitate the formation of a seal when clamped between mating flanges having surface irregularities therealong, as well as one which possesses excellent thermal conductivity characteristics. Among the various materials which have been found particularly satisfactory for this purpose is graphite of a self-bonded type which is fabricated in the form of a relatively compact foil and can range in thicknesses of generally about 0.003 up to about 0.015 inch. The heat conductivity of the heat-conductive strip comprised of graphite is usually upwards of ten times as great as that of the steel or other reinforcing metal of which the reinforcing network 22 is comprised, thereby providing a path of low resistance for heat flow from critical localized hot-spots to cooler sections of the supporting flange.

The application of the heat-conductive strips 32 to one or both faces of the base sheet can conveniently be achieved by suitable adhesive agents which serve to bond the strips and retain them in appropriate position during the fabrication of the gasket as well as during the installation thereof in an engine. Particularly satisfactory results are obtained employing any one of a variety of pressure sensitive-type adhesives of the types well known in the art by which the heat-conductive strips can be applied in the form of an overlying foil or tape over selective areas of the facing sheets to prevent the formation of localized hot-spots consistent with the intended end use of the gasket.

Self-bonded graphite foil materials which have been found particularly satisfactory for use in the fabrication of cylinder head gaskets of the present invention are characterized by the following physical properties: a density of from about 60 to about 80 pounds per cubic foot; less than 0.1 weight percent ash content; sublimation temperature of about 6,600°F.; an ultimate compressive strength of about 10,000 psi; an elastic modulus in tension of 200,000 psi; and a thermal conductivity at 2,000°F. along the longitudinal direction of the strip taken substantially parallel to its surface plane of about 25 BTU-ft. per square foot per hour per °F. Alternate materials possessing similar physical properties and in particular, thermal conductivities, can be satisfactorily employed in lieu of or in combination with the graphite material comprising the preferred substance.

While it will be apparent that the invention herein disclosed is well calculated to achieve the benefits and advantages thereof, it will be appreciated that the invention is susceptible to modification, variation and change without departing from the spirit thereof.

I claim:

1. A composite gasket suitable for use in flanged assemblies subjected to elevated temperatures such as internal combustion engine head gaskets and the like comprising a deformable base sheet of a generally rectangular configuration and in which at least the faces are comprised of asbestos, said base sheet formed with a plurality of adjoining apertures therethrough of which at least some are disposed in an aligned row corresponding to the cylinders of an engine, a metallic reinforcing grommet overlying the edge of each of said apertures and the opposite faces of said base sheet adjacent to said apertures, and a heat-conductive strip comprising a foil of graphite overlying at least one face of said base sheet in the area between said apertures and in underlying and heat-conductive contact with said reinforcing grommet, said heat-conductive strip extending transversely of the axis of the aligned cylinder apertures and between adjoining ones of said apertures to a position adjacent to the side edges of said base sheet which is adapted to be disposed in heat transfer relationship with mating flange surfaces at a temperature lower than that of the area between said apertures to form a heat-conductive path and facilitate a removal of heat therefrom.

2. The gasket as defined in claim 1, wherein said heat-conductive strip is applied in overlying relationship to each face of said base sheet.

3. The gasket as defined in claim 1, wherein said base sheet is of a laminated construction comprising a center sheet of metal to each of the opposite sides of which a sheet of asbestos is secured.

4. The gasket as defined in claim 1, wherein said heat-conductive strip has a coefficient of thermal conductivity at least about ten times as great as said base sheet.

5. The gasket as defined in claim 1, wherein said heat-conductive strips comprises a foil of graphite of a thickness ranging from 0.005 to about 0.015 inch.

6. The gasket as defined in claim 1, wherein said heat-conductive strip is adhesively bonded to the face of said base sheet.

7. The gasket as defined in claim 1, wherein said heat-conductive strips comprise foils of graphite applied to both faces of said base sheet.

* * * * *